United States Patent
Venugopal et al.

(10) Patent No.: US 10,367,650 B2
(45) Date of Patent: Jul. 30, 2019

(54) SYSTEM AND METHOD FOR EFFICIENTLY DEVELOPING AND TESTING HOME AUTOMATION SYSTEMS

(71) Applicant: Cognizant Technology Solutions India Pvt. Ltd., Chennai (IN)

(72) Inventors: Satish Venugopal, Chennai (IN); Subbiah Muthiah, Chennai (IN); Thiruvenkateswaran Ramachandran, Salem (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 15/860,956

(22) Filed: Jan. 3, 2018

(65) Prior Publication Data

US 2019/0140855 A1  May 9, 2019

(30) Foreign Application Priority Data

Nov. 6, 2017 (IN) .............................. 201741039440

(51) Int. Cl.
- *H04L 12/28* (2006.01)
- *G09B 5/12* (2006.01)
- *B25J 9/16* (2006.01)

(52) U.S. Cl.
CPC ........ *H04L 12/2805* (2013.01); *B25J 9/1697* (2013.01); *G09B 5/125* (2013.01); (Continued)

(58) Field of Classification Search
CPC ........ F24F 11/30; F24F 2110/10; F24F 11/52; F24F 11/56; F24F 2120/10; F24F 11/46; (Continued)

(56) References Cited

U.S. PATENT DOCUMENTS

| | | | | |
|---|---|---|---|---|
| 5,982,125 A | * | 11/1999 | Ranaudo | G01R 31/00 318/466 |
| 9,266,233 B2 | | 2/2016 | Kornbluh | |

(Continued)

FOREIGN PATENT DOCUMENTS

WO  2013027313 A1  2/2013

OTHER PUBLICATIONS

RATA, Robot Aided Test Automation, "Multi-Device UI Test Automation with RATA", Retrieved from Internet, URL: https://www.symbio.com/solutions/quality-assurance/rata-robot-aided-test-automation/, Dec. 26, 2017.

*Primary Examiner* — Faisal M Zaman
(74) *Attorney, Agent, or Firm* — Cantor Colburn LLP (57) ABSTRACT

A system and computer-implemented method for efficiently developing and testing home automation systems is provided. The system comprises one or more robotic modules configured to interact with home automation systems under test and home devices and appliances, wherein the one or more home devices and appliances are monitored by the home automation systems. The one or more robotic modules are further configured to execute test scripts received from a test automation framework in communication with the one or more robotic modules and initiate workflows based on the executed test scripts. Furthermore, the one or more robotic modules facilitate at least one of: the home automation systems and the connected home devices and appliances to perform actions based on the initiated workflows. The one or more robotic modules also forward results of the performed actions to the test automation framework for generating a report of the executed test scripts.

8 Claims, 5 Drawing Sheets

(52) U.S. Cl.
CPC .............. *G05B 2219/36429* (2013.01); *G05B 2219/39345* (2013.01)

(58) Field of Classification Search
CPC ........... F24F 11/62; F24F 11/58; G05B 15/02; G06F 3/04847; G06F 3/167; G06F 3/0482
USPC ....................... 700/276; 340/628, 514; 710/8
See application file for complete search history.

(56) References Cited

U.S. PATENT DOCUMENTS

| | | | | |
|---|---|---|---|---|
| 9,710,367 | B1* | 7/2017 | Nagineni | G06F 11/3684 |
| 2007/0156864 | A1* | 7/2007 | McCoy | G06F 9/545 |
| | | | | 709/222 |
| 2007/0239628 | A1* | 10/2007 | Peck | G06F 9/453 |
| | | | | 706/11 |
| 2008/0010539 | A1* | 1/2008 | Roth | G06F 11/3688 |
| | | | | 714/38.1 |
| 2008/0103610 | A1* | 5/2008 | Ebrom | D06F 39/005 |
| | | | | 700/29 |
| 2008/0133210 | A1* | 6/2008 | Chagoly | G06F 9/45512 |
| | | | | 703/22 |
| 2009/0307763 | A1* | 12/2009 | Rawlins | G06F 9/44505 |
| | | | | 726/5 |
| 2011/0113287 | A1* | 5/2011 | Gururaj | G06F 11/0766 |
| | | | | 714/37 |
| 2013/0158444 | A1 | 6/2013 | Herr | |
| 2014/0282407 | A1* | 9/2014 | Channamsetti | G06F 11/3684 |
| | | | | 717/124 |
| 2015/0199247 | A1* | 7/2015 | Sangani | G06F 11/3672 |
| | | | | 714/46 |
| 2015/0269848 | A1 | 9/2015 | Yuen | |
| 2016/0132426 | A1* | 5/2016 | Crawshay | G06F 11/3684 |
| | | | | 714/38.1 |
| 2016/0218884 | A1* | 7/2016 | Ebrom | D06F 33/02 |
| 2017/0075797 | A1* | 3/2017 | Ekambaram | G06F 11/3684 |

\* cited by examiner

| | | | | | |
|---|---|---|---|---|---|
| Execution Tool | Selenium_Desktop | | Project Name | Demo | |
| Test Case Name | 42241 | | Mobile OS | Chrome | |
| Platform | WINDOWS | | Iteration Mode | RunOneIterationOnly | |
| Start Iteration | | | End Iteration | | |
| Start Time | 10-May-2016 03:09:09 AM | | End Time | 10-May-2016 03:14:16 AM | |
| Test Case Status | Passed | | Total No. of Iterations | 1 | |
| No. of Passed Iteration | 1 | | No. of Iteration Failed | 0 | |
| S. No | Iteration No. | TimeStamp | ACTION | STATUS | SCREENSHOT |
| 1 | 1 | 10-May-2016 03:09:10 AM | Login ID Typed with abc@xyz.com | Pass | |
| 2 | 1 | 10-May-2016 03:09:10 AM | Password Typed with abcdefg | Pass | |
| 3 | 1 | 10-May-2016 03:11:04 AM | Door Faulted Successfully | Pass | |

Details of the execution

Steps executed for the use case, it could be on Web application 120 (Browser), Mobile Application 118 (Mobile Device) or Smart Device 112 (Robotic Module 110)

Status of the executed steps

Screenshot of each execution

Step by Robotic Module 110 on Home Automation System 112 (in this example Door Sensor)

SYSTEM AND METHOD FOR EFFICIENTLY DEVELOPING AND TESTING HOME AUTOMATION SYSTEMS

CROSS REFERENCE TO RELATED APPLICATION

This application claims the benefit of Indian Patent Application Number 201741039440 filed on Nov. 6, 2017, the contents of which are incorporated herein by reference in their entirety.

FIELD OF THE INVENTION

The present invention relates generally to home automation. More particularly, the present invention provides a system and method for efficiently developing and testing home automation systems.

BACKGROUND OF THE INVENTION

Home automation facilitates people to remotely control devices and appliances at home. The devices and appliances are integrated with the home automation products and people can access them using their smartphones and other mobile devices. In the last few years, home automation systems have seen unprecedented growth with expanding use cases from security to remote monitoring and accessibility of user homes. Many players have emerged offering state-of-art home automation products. To keep up with the market pace, enterprises endeavor to reduce time to market and costs by efficiently developing and testing their home automation products and solutions.

Conventionally, various systems and methods exist for developing and testing home automation systems. For example, developers and testers manually operate physical devices and appliances for developing and testing the home automation systems. However, the abovementioned systems and methods have several disadvantages. Manually using physical devices and appliances for development and testing is time consuming, lacks efficiency, repetitive, prone to human errors and judgment and poses many logistic problems. Moreover, the ecosystem of home automation solution with the presence of numerous devices (and corresponding models & versions) and appliances with longer product life demands backward compatibility and impacts interoperability between various smart devices, firmware version, device types and mobile device operating system versions. Therefore, majority of effort is spent on validating functionalities, regression and interoperability which results in less time for enriching overall customer experience.

In light of the above-mentioned disadvantages, there is a need for a system and method for efficiently developing and testing home automation systems. Further, there is a need for a system and method that leverages robotics for testing home automation systems. Furthermore, there is a need for a system and method that seamlessly and automatically facilitates end to end integrated testing of home automation solutions without the need for manually operating physical devices and appliances. In addition, there is a need for an automated system and method that reduces time to market, reduces errors and does not pose any logistic problems during development and testing of home automation products. Also, there is a need for a system and method that is device agnostic and capable of leveraging same test environment and testing scripts to validate interoperability of different types of smart devices from various manufacturers and compatibility of the home automation application with various mobile operating systems.

SUMMARY OF THE INVENTION

A system, computer-implemented method and computer program product for efficiently developing and testing home automation systems is provided. The system comprises one or more robotic modules configured to interact with one or more home automation systems under test and one or more home devices and appliances, wherein the one or more home devices and appliances are monitored by the one or more home automation systems under test. The one or more robotic modules further configured to execute one or more test scripts received from a test automation framework in communication with the one or more robotic modules and initiate one or more workflows based on the one or more executed test scripts. Furthermore, the one or more robotic modules are configured to facilitate at least one of: the one or more home automation systems and the one or more connected home devices and appliances to perform one or more actions based on the initiated one or more workflows. The one or more robotic modules are also configured to forward results of the one or more performed actions to the test automation framework for generating a report of the one or more executed test scripts based on the forwarded results.

In an embodiment of the present invention, the system further comprises a gateway configured to receive the one or more test scripts from the test automation framework and forward the one or more test scripts for execution to the one or more robotic modules. In an embodiment of the present invention, the system further comprises a cloud infrastructure configured to facilitate communication between the test automation framework and the gateway.

In an embodiment of the present invention, the one or more home devices and appliances comprise interactive smart speakers, door and motion sensors, flood sensors, security cameras, thermostats, smart light switches, smoke detector and glass break sensors. In an embodiment of the present invention, the one or more test scripts facilitate testing one or more use cases of the one or more home automation systems under test. In an embodiment of the present invention, the generated report comprises test case name, execution tool name, date of execution, project name, iteration mode, number of iteration, number of passed iteration, number of failed iteration, start and end time of execution and details of each executed test step along with status, timestamp, action and screenshot.

The computer-implemented method for efficiently developing and testing home automation systems, via program instructions stored in a memory and executed by a processor, comprises configuring one or more home devices and appliances, monitored by one or more home automation systems under test, with one or more robotic modules, wherein the one or more robotic modules interact with the one or more home automation systems under test. The computer-implemented method further comprising executing one or more test scripts via a test automation framework in communication with the one or more robotic modules. Furthermore, the computer-implemented method comprises initiating, by the one or more robotic modules, one or more workflows based on the one or more executed test scripts. The computer-implemented method also comprises facilitating, by the one or more robotic modules, at least one of: the one or more home automation systems and the one or more configured home devices and appliances to perform one or more actions based on the initiated one or more workflows. In addition, the computer-implemented method comprises generating a report of the one or more executed test scripts based on results of the one or more performed actions.

The computer program product for efficiently developing and testing home automation systems comprises a non-transitory computer-readable medium having computer-readable program code stored thereon, the computer-readable program code comprising instructions that when executed by a processor, cause the processor to: configure one or more home devices and appliances, monitored by one or more home automation systems under test, with one or more robotic modules, wherein the one or more robotic modules interact with the one or more home automation systems under test. The processor further executes one or more test scripts via a test automation framework in communication with the one or more robotic modules. Furthermore, the processor initiates, by the one or more robotic modules, one or more workflows based on the one or more executed test scripts. The processor also facilitates, by the one or more robotic modules, at least one of: the one or more home automation systems and the one or more configured home devices and appliances to perform one or more actions based on the initiated one or more workflows. The processor further generates a report of the one or more executed test scripts based on results of the one or more performed actions.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for efficiently developing and testing home automation systems is described herein. The invention provides for a system and method that leverages robotics for testing home automation systems. Further, the invention provides for a system and method that seamlessly and automatically facilitates end to end integrated testing of home automation systems without the need for manually operating physical devices and appliances. Furthermore, the invention provides for a system and method that reduces time to market and does not pose any logistic problems during development and testing of home automation products. Also, the invention provides for a system and method that is device agnostic and capable of leveraging same test environment and testing scripts to validate interoperability of different types of smart devices from various manufacturers and compatibility of the home automation application with various mobile operating systems.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
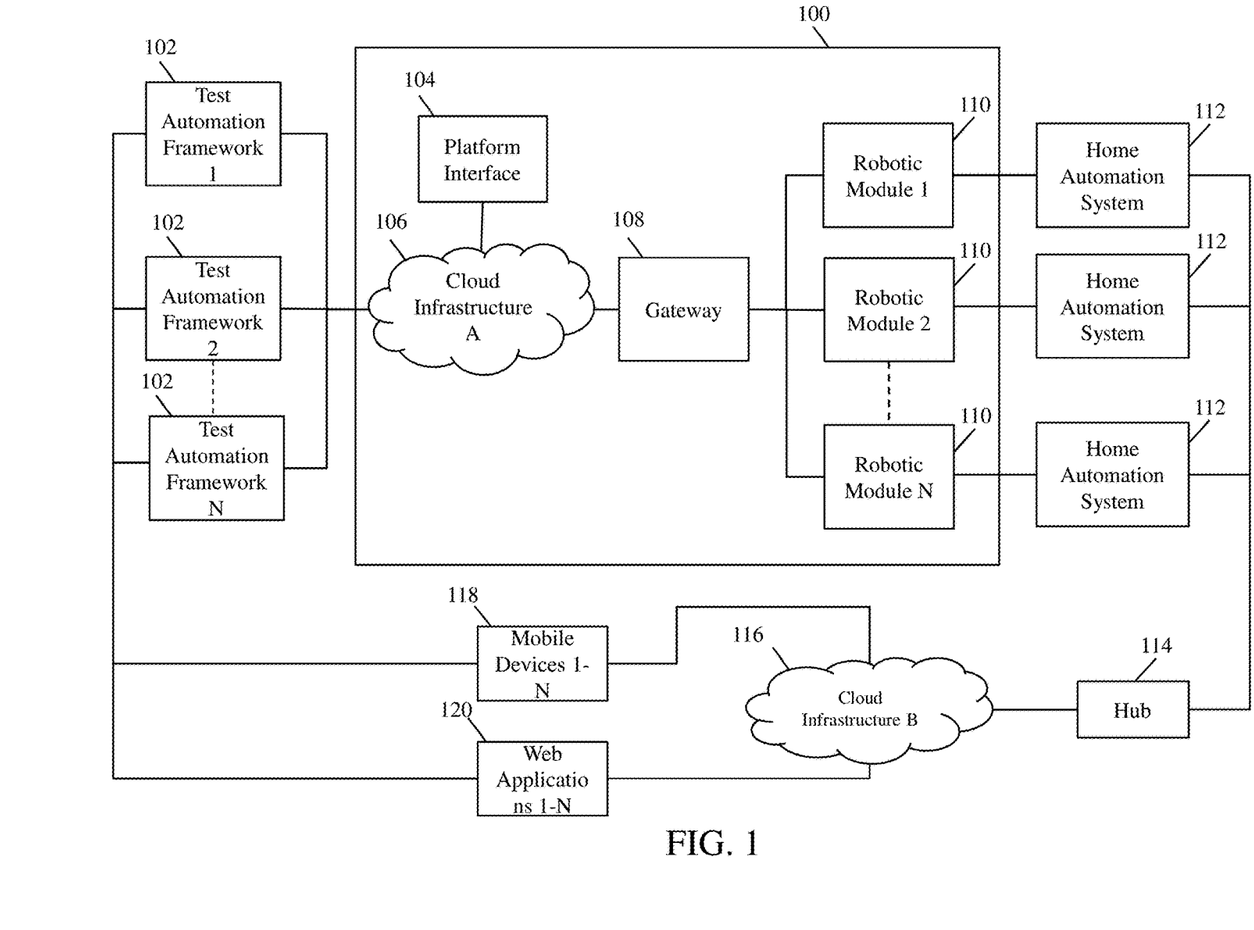
FIG. 1 is a block diagram illustrating a system for efficiently developing and testing home automation systems, in accordance with an embodiment of the present invention.

FIG. 1 is a block diagram illustrating a system 100 for efficiently developing and testing home automation systems, in accordance with an embodiment of the present invention. The system 100 comprises a platform interface 104, a cloud infrastructure A 106, a gateway 108 and one or more robotic module 110. The system 100 is connected with existing one or more test automation frameworks 102 via one or more Application Programming Interfaces (APIs). The one or more robotic modules 110 are further connected to one or more home automation systems 112 under test. The one or more home automation systems 112 are accessible via one or more mobile devices 118 and one or more web applications 120 for remote monitoring of one or more home devices and appliances.

The one or more test automation frameworks 102 comprise one or more test automation tools used by one or more enterprises in developing and testing one or more home automation systems 112. In an embodiment of the present invention, the one or more test automation frameworks 102 in conjunction with the system 100 facilitate automated testing of the one or more home automation systems 112. The one or more home automation systems 112 include, but not limited to, the one or more home devices and appliances and a user interface. In an embodiment of the present invention, the one or more home automation systems 112 are accessible to one or more consumers via a home automation application using one or more electronic communication devices. The electronic communication devices include the one or more mobile devices 118 such as, but not limited to, mobile phone, desktop, laptop, wearable devices and tablets. In an embodiment of the present invention, the one or more home automation systems 112 are accessible via the one or more web applications 120. The one or more web applications 120 facilitate the one or more consumers to configure or access the one or more home automation systems 112.

The platform interface 104 is a web based user-interface to facilitate one or more users to interact and provide commands directly to the one or more robotic modules 110. The one or more users include, but not limited to, developers and testers responsible for developing and testing the one or more home automation systems 112. Once the testing is complete, the one or more home automation systems 112 are deployed in locations such as, but not limited to, homes and offices of the one or more consumers. Further, the one or more home devices and appliances of the one or more consumers are then configured with the one or more home automation systems 112 for real-time remote monitoring. The invention focuses on use of the system 100 during development and testing of the one or more home automation systems 112 and therefore, for purpose of clarity, the one or more home devices and appliances referred hereinafter in the specification are used in conjunction with the system 100 during testing phase.

The one or more test automation frameworks 102 are configured to provide options to the one or more users to execute one or more test scripts for testing the one or more home automation systems 112. The one or more test scripts facilitate testing one or more use cases of the one or more home automation systems 112 under test. The one or more test automation frameworks 102 communicate with the gateway 108 via the cloud infrastructure A 106. The one or more test scripts are received and forwarded by the gateway 108 to the one or more robotic modules 110 for execution to facilitate testing different functionalities of the one or more home automation systems 112 under test. On execution, the one or more test scripts initiate one or more workflows at the system 100 by triggering respective commands in the one or more robotic modules 110. Based on the one or more initiated workflows, the one or more robotic modules 110 facilitate the one or more home devices and appliances or the one or more home automation systems 112 to perform one or more actions corresponding to the one or more executed test scripts required for testing the one or more use cases of the one or more home automation systems 112 under test. In an embodiment of the present invention, the one or more use cases include, but not limited to, switching off a smart light and updating the home automation application installed on a tablet, sounding a fire alarm and sending alerts on the one or more mobile devices configured with the one or more home automation systems 112 and the likes.

In an embodiment of the present invention, the one or more users fetch information pertaining to APIs for communicating with the one or more robotic modules 110 via the platform interface 104. The information pertaining to the APIs is provisioned in the one or more test automation frameworks 102 which then facilitates access to the one or more robotic modules 110 that drive home automation devices and appliances. In an exemplary embodiment of the present invention, the one or more test automation frameworks 102 that drives multiple heterogeneous components of the one or more home automation systems 112 uses, but not limited to, Selenium for automatically testing the one or more use cases corresponding to the one or more web applications 120 and Appium for automatically testing the one or more use cases corresponding to the one or more mobile devices 118. On initiating execution of the one or more test scripts via the one or more web applications 120 or the one or more mobile devices 118 or both, the APIs obtained from the platform interface 104 are used for triggering the one or more robotic modules 110 for action on the one or more home automation devices and appliances via the cloud infrastructure B 116. Further, the cloud infrastructure B 116 facilitates communication with the one or more robotic modules 110 and the one or more home automation systems 112 via the hub 114.

The one or more test scripts are capable of initiating automation flow across various components of home automation ecosystem. The system 100 is completely agnostic of any test automation framework 102. The one or more test automation frameworks 102 is replaceable with any one or more user defined, customer built framework that can leverage any one or more test automation tools for various components of the home automation ecosystem.

The gateway 108 is an optional component of the system 100 which acts as an integrator of the multiple robotic modules 110. The gateway 108 also acts as a router for the traffic between the one or more test automation frameworks 102 and the one or more robotic modules 110. In an exemplary embodiment of present invention, the gateway 108 is normal windows or Mac machine.

The one or more initiated workflows based on the one or more executed scripts from the one or more test automation frameworks 102 send, either directly or via the gateway 108, a command to the robotic module 110 to invoke a specific home device/appliance for execution of the one or more test scripts. The robotic module 110 interacts with the one or more home automation systems 112 under test and one or more home devices and appliances. Further, the one or more home devices and appliances are monitored by the one or more home automation systems under test. The robotic module 110 also facilitates executing the one or more test scripts received from the one or more test automation frameworks 102 and initiates the one or more workflows based on the one or more executed test scripts. The robotic module 110 then facilitates at least one of: the one or more home automation systems 112 under test and the one or more connected home devices and appliances to perform one or more actions based on the initiated one or more workflows. The results of the one or more performed actions are the forwarded to the one or more test automation frameworks 102 for generating one or more reports of the one or more executed test scripts based on the forwarded results. In an embodiment of the present invention, the generated one or more reports comprise test case name, execution tool name, date of execution, project name, iteration mode, number of iteration, number of passed iteration, number of failed iteration, start and end time of execution and details of each executed test step along with status, timestamp, action and screenshot. The robotic module 110 is discussed in detail in conjunction with FIG. 1A.

Figure 1A:
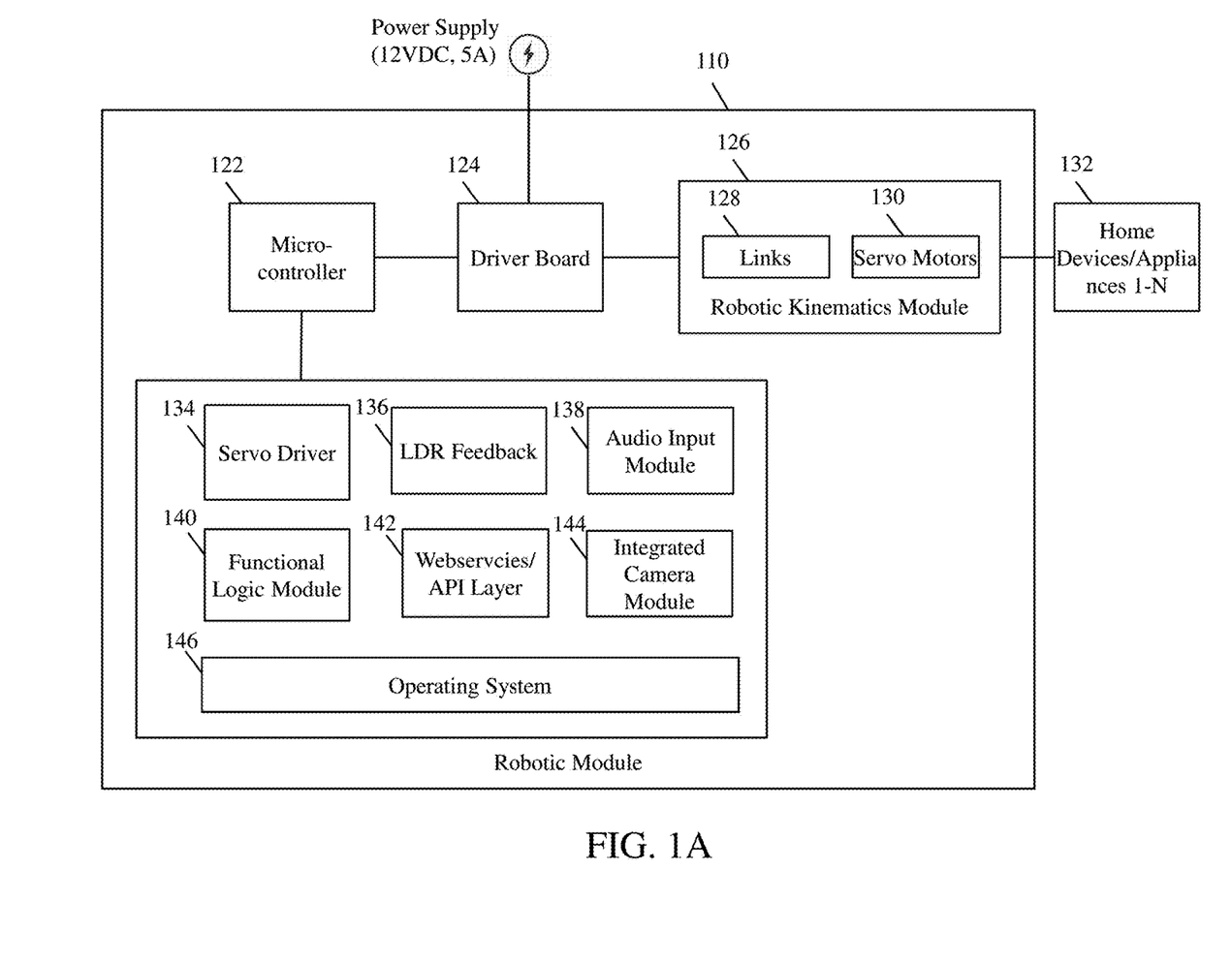
FIG. 1A is a detailed block diagram of a robotic module 110, in accordance with an embodiment of the present invention.

FIG. 1A is a detailed block diagram of the robotic module 110, in accordance with an embodiment of the present invention. The robotic module 110 is a device comprising a microcontroller 122, a driver board 124, a robotic kinematics module 126, a servo driver 134, a Light Dependent Resistor (LDR) feedback 136, an audio input module 138, a functional logic module 140, a Webservices/API layer 142, an integrated camera module 144 and an operating system 146. Further, the robotic module 110 is connected to the one or more home devices and appliances 132.

The driver board 124 is an electronic circuit that provides power to the microcontroller 122 and one or more servo motors 130 within the robotic kinematics module 126 for driving the one or more home devices and appliances 132. The one or more home devices and appliances 132 are connected with the robotic module 110 and monitored by the one or more home automation systems 112. The driver board 124 is capable of providing regulated power that is needed for the microcontroller 122 and the one or more servo motors 130. In an embodiment of the present invention, the one or more home devices and appliances 132 include, but not limited to, interactive smart speakers, door and motion sensors, flood sensors, security cameras, thermostats, smart light switches, smoke detector and glass break sensors.

The microcontroller 122 acts as the base processor and runs the operating system 146 supported by custom libraries.

In an exemplary embodiment of the present invention, the microcontroller 122 is Raspberry Pi and the operating system 146 is Raspbian OS.

The functional logic module 140 contains all functional logic for the functionalities provided by the robotic module 110. The functional logic module 140 facilitates exposing REpresentational State Transfer (REST) webservice that acts as an interface for any one or more test automation frameworks 102 to trigger commands in the robotic module 110, which in turn drives target home devices/appliances 132. In an exemplary embodiment of the present invention, the functional logic is written in python scripts.

The servo driver 134 provides an interface to drive the one or more servo motors 130 via General Purpose Input/Output (GPIO) pins of the microcontroller 122. Further, the functional logic module 140 controls positions of the one or more servo motors 130 by sending commands to the servo driver 134.

The LDR feedback module 136 facilitates sensing Light Emitting Diode (LED) operations in the one or more home devices/appliances 132. In an embodiment of the present invention, a physical LDR is connected to the GPIO pins of the microcontroller 122 as part of the LDR feedback module 136. Further, output of the LDR feedback module 136 is used by the functional logic module 140 for end to end test automation scenarios.

The integrated camera module 144 comprises an integrated camera for facilitating remote access functionality of the system 100 and for display image validation of smart device screens. The integrated camera module 144 allows the one or more users to control the robotic module 110 remotely and drive operations or end to end automation on the one or more home devices/appliances 132.

In an embodiment of the present invention, the system 100 is hosted locally. In another embodiment of the present invention, the system 100 is hosted in a cloud environment and accessed by the one or more users remotely for testing. In an embodiment of the present invention, the one or more test automation frameworks 102 are hosted in a computer system which is used to trigger the one or more test scripts.

Figure 2:
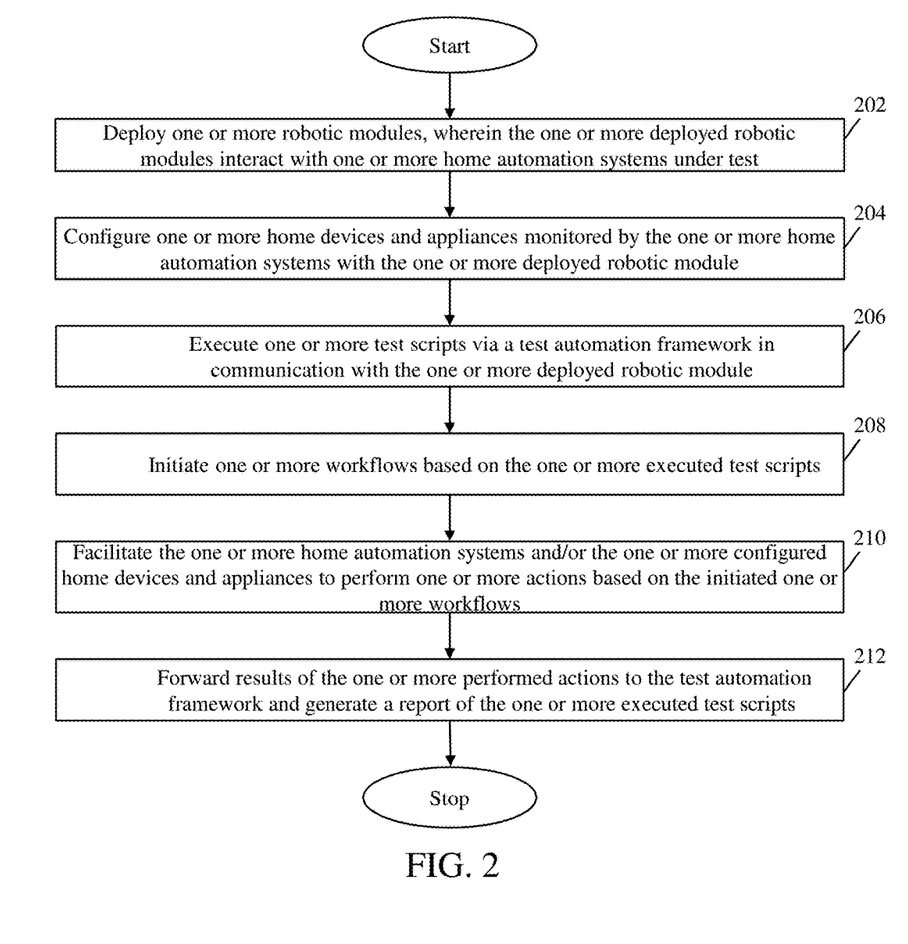
FIG. 2 is a flowchart illustrating a method for efficiently developing and testing home automation systems, in accordance with an embodiment of the present invention.

FIG. 2 is a flowchart illustrating a method for efficiently developing and testing home automation systems, in accordance with an embodiment of the present invention.

At step 202, one or more robotic modules are deployed, wherein the one or more deployed robotic modules interact with one or more home automations systems under test. The one or more deployed robotic modules are configured to facilitate one or more users to automatically test one or more use cases related to the one or more home automation systems under test by interacting with the one or more home automation systems under test.

At step 204, one or more home devices and appliances, monitored by the one or more home automation systems under test, are configured with the one or more deployed robotic modules. In an embodiment of the present invention, the one or more home devices and appliances comprise interactive smart speakers, door and motion sensors, flood sensors, security cameras, thermostats, smart light switches, smoke detector and glass break sensors.

At step 206, one or more test scripts are executed via one or more test automation frameworks in communication with the one or more deployed robotic modules. The one or more test automation frameworks are configured to provide options to the one or more users to facilitate execution of the one or more test scripts for testing the one or more use cases of the one or more home automation systems. In an embodiment of the present invention, the information pertaining to APIs for communicating with the deployed robotic module is fetched by the one or more test automation frameworks. The information pertaining to the APIs is provisioned in the one or more test automation frameworks which facilitates access to the deployed robotic module that interact with the one or more home automation devices and appliances and the one or more home automation systems under test for execution of the one or more test scripts.

At step 208, one or more workflows based on the executed test script are initiated by the one or more robotic modules. In an embodiment of the present invention, the one or more test scripts facilitate testing one or more use cases of the one or more home automation systems under test. At step 210, the one or more home automation systems and/or the one or more configured home devices and appliances are facilitated by the one or more robotic modules to perform one or more actions based on the initiated one or more workflows. Further, results of the one or more performed actions are recorded to validate the functionalities of the one or more home automation systems.

Figure 2A:
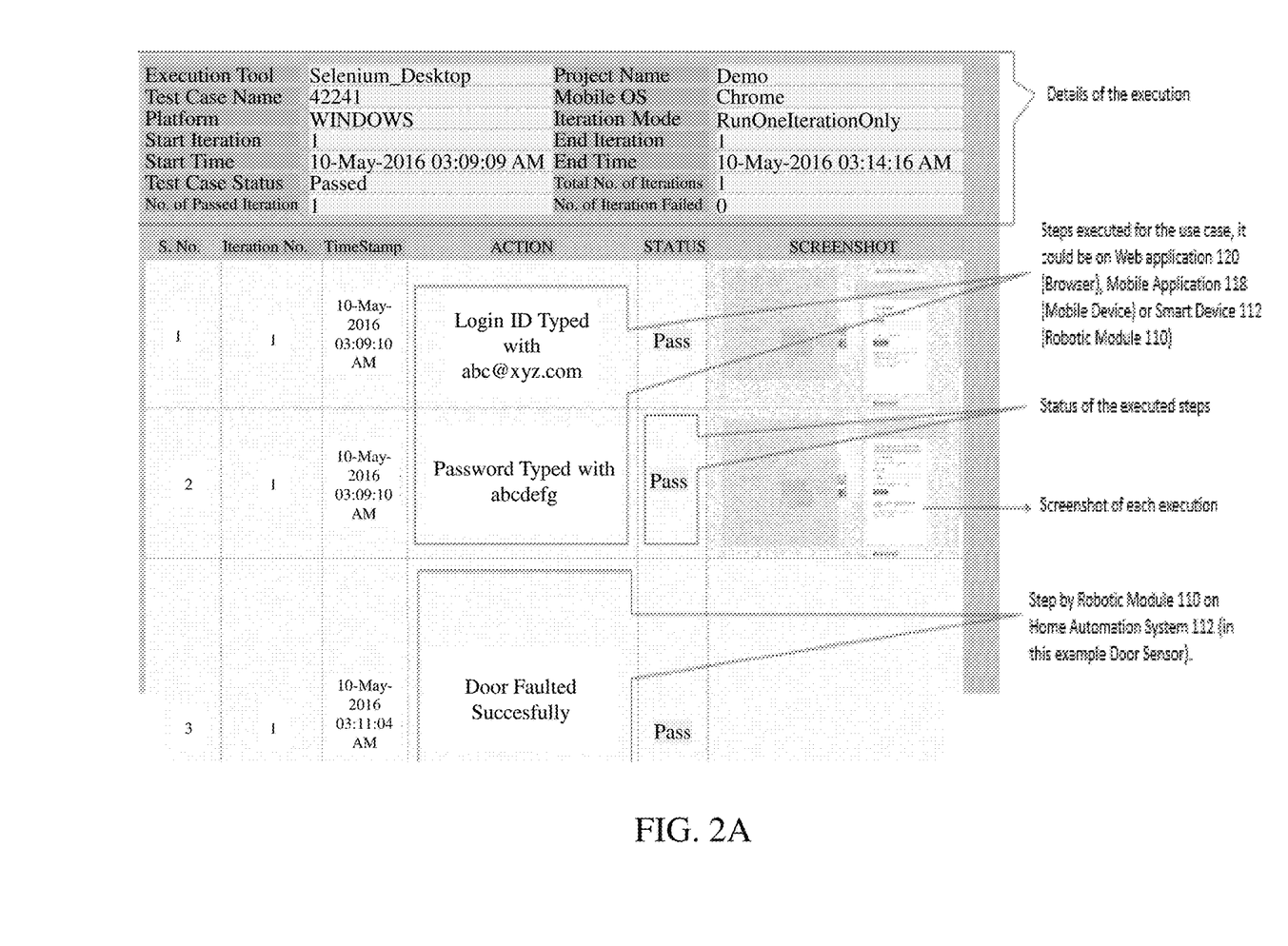
FIG. 2A illustrates a screenshot of a report comprising details related to execution of test scripts, in accordance with an embodiment of the present invention.

At step 212, results of the one or more performed actions are forwarded to the test automation framework for generating a report of the one or more executed test scripts. The report comprises details of the one or more executed test scripts such as, but not limited to, test case name, execution tool name, date of execution, project name, iteration mode, number of iteration, number of passed iteration, number of failed iteration, start and end time and details of each executed test step along with their status, timestamp, action and screenshot. FIG. 2A illustrates a screenshot of a report comprising details related to execution of test scripts, in accordance with an embodiment of the present invention.

Figure 3:
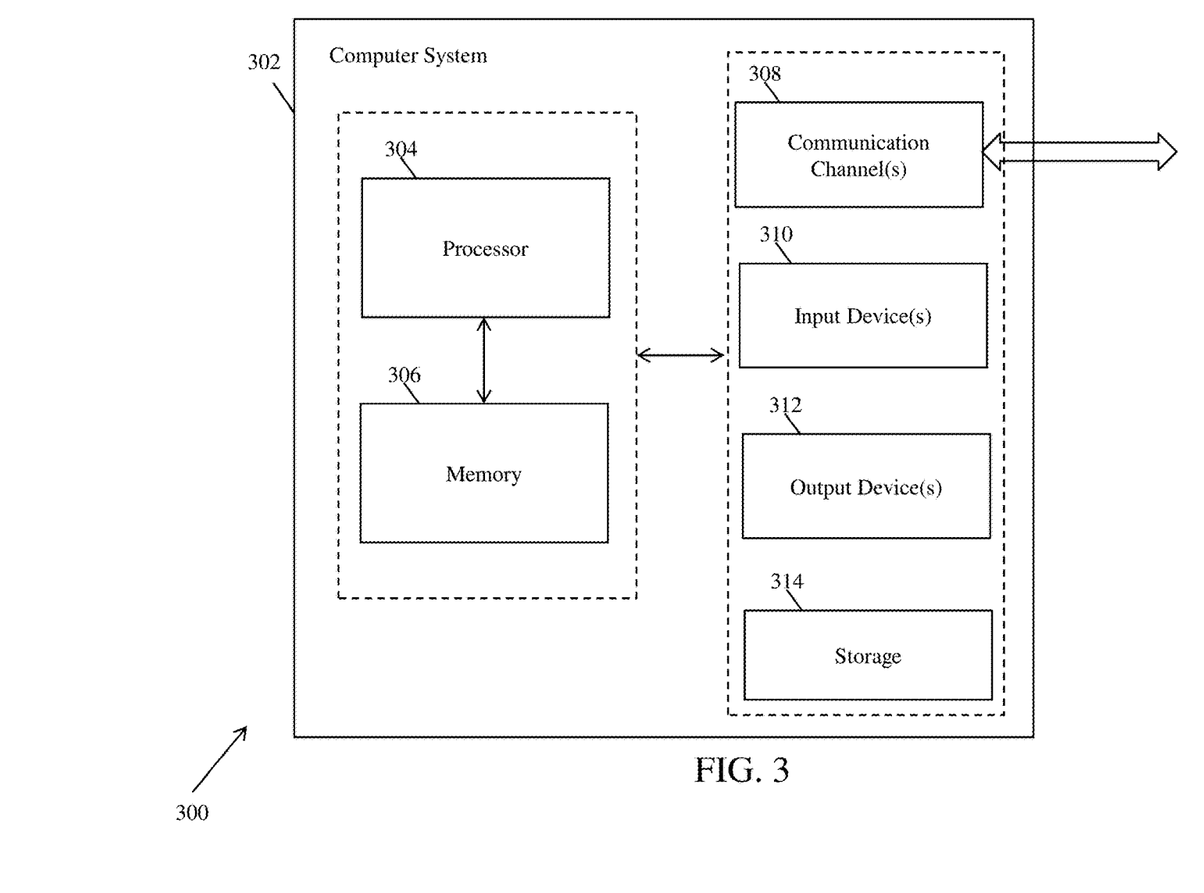
FIG. 3 illustrates an exemplary computer system for efficiently developing and testing home automation systems, in accordance with an embodiment of the present invention.

FIG. 3 illustrates an exemplary computer system for efficiently developing and testing home automation systems, in accordance with an embodiment of the present invention.

The computer system 302 comprises a processor 304 and a memory 306. The processor 304 executes program instructions and may be a real processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for efficiently developing and automating testing of home automation systems, wherein the system is connected to one or more home automation systems under test and receives one or more test scripts from one or more test automation frameworks for testing one or more home automation systems, the system comprising:
    a memory storing program instructions;
    a processor for executing program instructions stored in a memory;
    one or more robotic modules in communication with the processor configured to:
        execute one or more test scripts for testing one or more home automation systems under test, wherein the one or more test scripts facilitate testing of one or more use cases across various components of the one or more home automation systems under test;
        initiate one or more workflows based on the one or more executed test scripts, wherein the one or more initiated workflows invoke at least one component of the one or more home automation systems to perform one or more actions based on the initiated one or more workflows; and
        forward results of the one or more performed actions to a test automation framework for generating a report of the one or more executed test scripts based on the forwarded results, wherein, the generated report comprises test case name, execution tool name, date of execution, project name, iteration mode, number of iteration, number of passed iteration, number of failed iteration, start and end time of execution and details of each executed test step along with status, timestamp, action and screenshot.

2. The system of claim 1, further comprising a gateway configured to:
    receive the one or more test scripts from the test automation framework; and
    forward the one or more test scripts for execution to the one or more robotic modules.

3. The system of claim 2, further comprising a cloud infrastructure configured to facilitate communication between the test automation framework and the gateway.

4. The system of claim 1, wherein the components of the home automation system include home devices and appliances comprising interactive smart speakers, door and motion sensors, flood sensors, security cameras, thermostats, smart light switches, smoke detector and glass break sensors.

5. A computer-implemented method for developing and automating testing of home automation systems, via program instructions stored in a memory and executed by a processor, wherein the method is implemented by a system receiving one or more test scripts from one or more test automation frameworks for testing one or more home automation systems, the system is connected to the one or more home automation systems under test, the computer-implemented method comprising:
    executing, via one or more robotic modules, the one or more test scripts for testing different functionalities of one or more home automation systems under test, wherein the one or more test scripts facilitate testing of one or more use cases of various components the one or more home automation systems under test;
    initiating, by the one or more robotic modules, one or more workflows based on the one or more executed test scripts, wherein the one or more workflows invoke at least one component of the home automation system for execution of the one or more test scripts to perform one or more actions based on the initiated one or more workflows; and
    generating, by a test automation framework, a report of the one or more executed test scripts based on results of the one or more performed actions, wherein the generated report comprises test case name, execution tool name, date of execution, project name, iteration mode, number of iteration, number of passed iteration, number of failed iteration, start and end time of execution and details of each executed test step along with status, timestamp, action and screenshot.

6. The computer-implemented method of claim 5, wherein the components of the home automation system include home devices and appliances comprising interactive smart speakers, door and motion sensors, flood sensors, security cameras, thermostats, smart light switches, smoke detector and glass break sensors.

7. A computer program product for developing and automating testing of home automation systems, the computer program product comprising:
    a non-transitory computer-readable medium having computer-readable program code stored thereon, the computer-readable program code comprising instructions that when executed by a processor, cause the processor to:
        configure one or more home devices and appliances, monitored by one or more home automation systems under test, with one or more robotic modules, wherein the one or more robotic modules interact with the one or more home automation systems under test;
        execute, via the one or more robotic modules, one or more test scripts, received from one or more test automation framework, for testing different functionalities of one or more home automation systems under test, wherein the one or more test scripts facilitate testing of one or more use cases of various components of the one or more home automation systems under test;
        initiate, by the one or more robotic modules, one or more workflows based on the one or more executed test scripts, wherein the one or more workflows invoke at least one component of the one or more home automation systems for execution of the one or more test scripts to perform one or more actions based on the initiated one or more workflows; and
        generate a report of the one or more executed test scripts based on results of the one or more performed actions, wherein the generated report comprises test case name, execution tool name, date of execution, project name, iteration mode, number of iteration, number of passed iteration, number of failed iteration, start and end time of execution and details of each executed test step along with status, timestamp, action and screenshot.

8. The computer program product of claim 7, wherein the components include home devices and appliances comprising interactive smart speakers, door and motion sensors, flood sensors, security cameras, thermostats, smart light switches, smoke detector and glass break sensors.

* * * * *